(12) United States Patent
Lee et al.

(10) Patent No.: US 10,708,914 B2
(45) Date of Patent: Jul. 7, 2020

(54) METHOD FOR TRANSMITTING AND RECEIVING DOWNLINK SIGNAL IN WIRELESS COMMUNICATION SYSTEM AND DEVICE FOR SAME

(71) Applicant: LG ELECTRONICS INC., Seoul (KR)

(72) Inventors: Seungmin Lee, Seoul (KR); Suckchel Yang, Seoul (KR); Hanbyul Seo, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 15/029,509

(22) PCT Filed: Nov. 7, 2014

(86) PCT No.: PCT/KR2014/010678
§ 371 (c)(1),
(2) Date: Apr. 14, 2016

(87) PCT Pub. No.: WO2015/069054
PCT Pub. Date: May 14, 2015

(65) Prior Publication Data
US 2016/0278089 A1 Sep. 22, 2016

Related U.S. Application Data

(60) Provisional application No. 61/901,422, filed on Nov. 7, 2013.

(51) Int. Cl.
*H04W 4/00* (2018.01)
*H04W 72/04* (2009.01)
(Continued)

(52) U.S. Cl.
CPC ...... *H04W 72/0453* (2013.01); *H04B 7/2656* (2013.01); *H04L 5/0096* (2013.01); *H04L 5/14* (2013.01); *H04W 72/042* (2013.01)

(58) Field of Classification Search
USPC ....... 370/229, 230, 236, 280, 252, 328, 329, 370/330
See application file for complete search history.

(56) References Cited

U.S. PATENT DOCUMENTS 9,198,178 B2 * 11/2015 Skov ............ H04L 5/0007
9,479,307 B2 * 10/2016 Ji .................. H04L 5/0037
(Continued)

FOREIGN PATENT DOCUMENTS

WO   WO 2013/162785 A1   10/2013

OTHER PUBLICATIONS

Huawei et al., "Addition of New Test Case for TDD Additional Special Subframe Configuration with CRS Based Transmission Scheme," R5-131617, 3GPP TSG-RAN WG5 Meeting #59, Fukuoka, Japan, May 20-24, 2013, 9 pages.*

*Primary Examiner* — Nguyen H Ngo
(74) *Attorney, Agent, or Firm* — Birch, Stewart, Kolasch & Birch, LLP

(57) ABSTRACT

The present invention relates to a method and a device for receiving a downlink signal by a terminal in a wireless communication system using a time division duplex (TDD) scheme. Specifically, the present invention comprises the steps of: receiving a usage change message indicating a change from a first uplink-downlink configuration to a second uplink-downlink configuration; with regard to a specific subframe, when a wireless frame type according to the first uplink-downlink configuration is different from a wireless frame type according to the second uplink-downlink configuration, determining a subframe type on the basis of a special subframe configuration associated with the first uplink-downlink configuration; and receiving a downlink signal on the basis of the determined subframe type.

8 Claims, 11 Drawing Sheets

(51) Int. Cl.
*H04B 7/26* (2006.01)
*H04L 5/00* (2006.01)
*H04L 5/14* (2006.01)

(56) References Cited

U.S. PATENT DOCUMENTS

| | | | |
|---|---|---|---|
| 2012/0300718 A1* | 11/2012 | Ji | H04L 5/0051 370/329 |
| 2013/0039193 A1* | 2/2013 | Yin | H04W 72/0486 370/252 |
| 2013/0107826 A1* | 5/2013 | Dinan | H04W 16/32 370/329 |
| 2013/0223298 A1* | 8/2013 | Ahn | H04B 7/2643 370/280 |
| 2013/0242823 A1 | 9/2013 | Lin et al. | |
| 2013/0272170 A1* | 10/2013 | Chatterjee | H04W 28/08 370/280 |
| 2014/0029489 A1* | 1/2014 | Han | H04L 1/1812 370/280 |
| 2014/0036742 A1* | 2/2014 | Charbit | H04W 52/0235 370/280 |
| 2014/0086112 A1* | 3/2014 | Stern-Berkowitz | H04L 5/14 370/280 |
| 2014/0241222 A1* | 8/2014 | Yang | H04L 5/0091 370/280 |
| 2014/0241223 A1* | 8/2014 | Takeda | H04W 72/1289 370/280 |
| 2015/0043434 A1* | 2/2015 | Yamada | H04W 72/0446 370/329 |
| 2015/0250017 A1* | 9/2015 | Ingale | H04B 7/2615 370/280 |
| 2015/0295688 A1* | 10/2015 | Pan | H04B 7/0667 370/329 |
| 2016/0149687 A1* | 5/2016 | Lei | H04W 16/10 370/280 |
| 2016/0218788 A1* | 7/2016 | Yum | H04B 7/0626 |

\* cited by examiner

FIG. 2
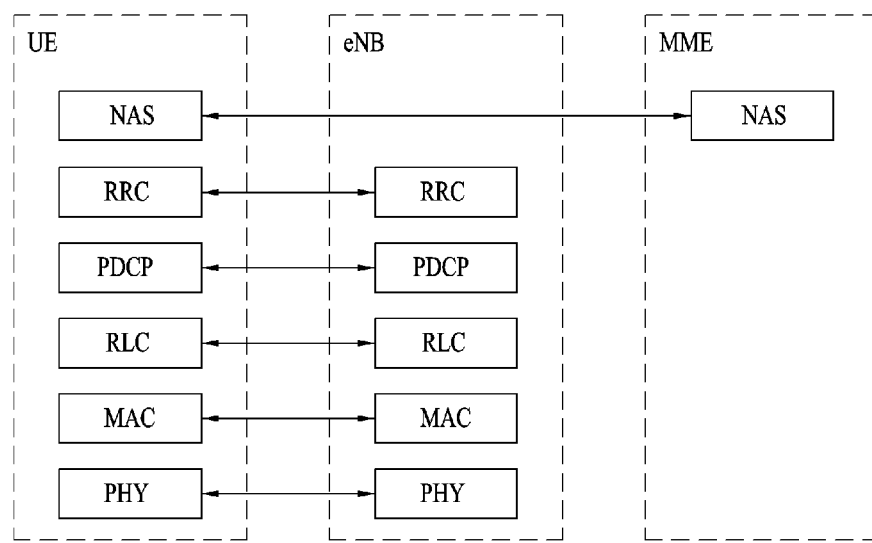
(a) Control-plane protocol stack
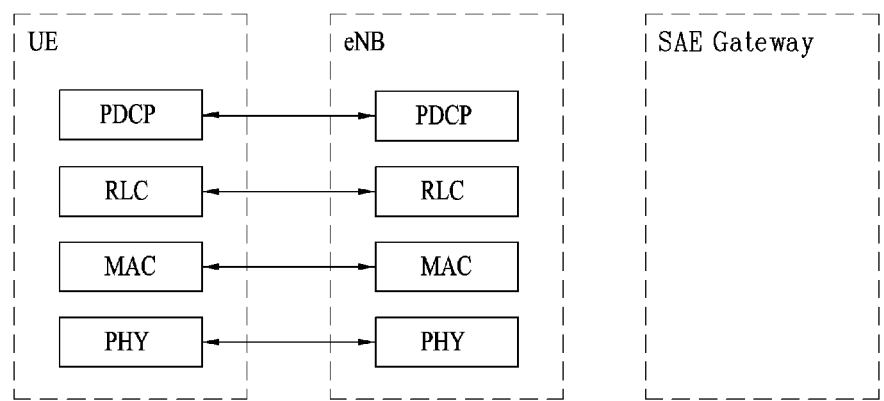
(b) User-plane protocol stack

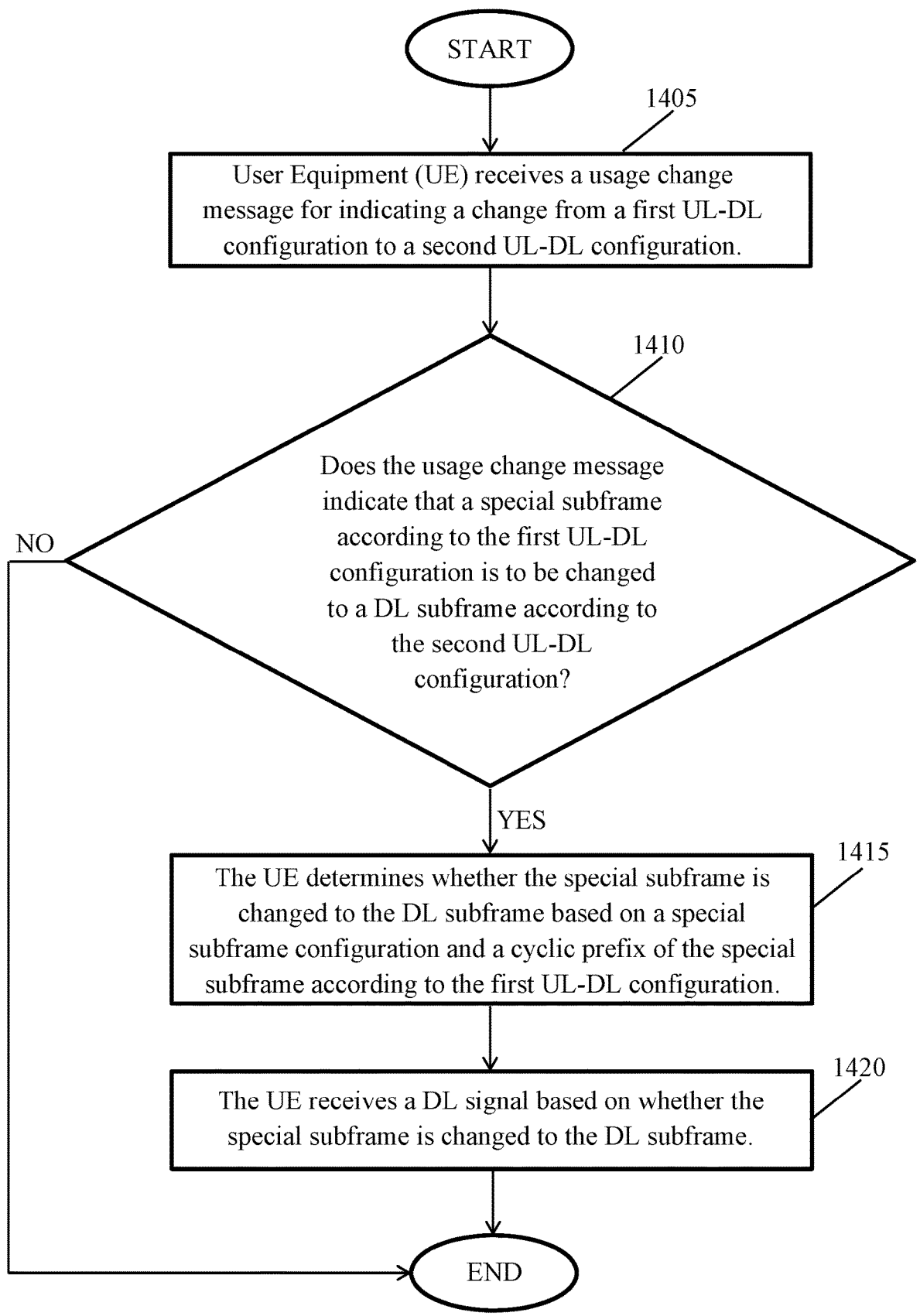

METHOD FOR TRANSMITTING AND RECEIVING DOWNLINK SIGNAL IN WIRELESS COMMUNICATION SYSTEM AND DEVICE FOR SAME

CROSS REFERENCE TO RELATED APPLICATIONS

This application is the National Phase of PCT/KR2014/010678 filed on Nov. 7, 2014, which claims priority under 35 U.S.C. § 119(e) to U.S. Provisional Application No. 61/901,422 filed on Nov. 7, 2013, all of which are hereby expressly incorporated by reference into the present application.

TECHNICAL FIELD

The present invention relates to a wireless communication system, and more particularly, to a method of transmitting and receiving a downlink signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

An object of the present invention is to provide a method of transmitting and receiving a downlink signal in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a downlink signal, which is received by a user equipment in a wireless communication system of a TDD (time division duplex) scheme, includes the steps of receiving a usage change message for indicating a change from a first uplink-downlink (UL-DL) configuration to a second uplink-downlink (UL-DL) configuration, if a radio frame type according to the first UL-DL configuration and a radio frame type according to the second UL-DL configuration are different from each other in regard to a specific subframe, determining a subframe type based on a special subframe configuration associated with the first UL-DL configuration, and receiving a downlink signal based on the determined subframe type.

Moreover, the downlink signal receiving step may correspond to a step of receiving a downlink signal based on at least one selected from the group consisting of a PDSCH (physical downlink shared channel)/EPDCCH (enhanced physical downlink control channel) resource element mapping rule, a DM-RS (demodulation reference signal) pattern, a CRS transmission pattern, and an EPDCCH transmission rule according to the determined subframe type.

Moreover, if the special subframe configuration corresponds to a special subframe configuration #0 or a special subframe configuration #5 according to a normal cyclic prefix, the subframe type can be determined as a downlink subframe.

Moreover, if the special subframe configuration corresponds to a special subframe configuration #0 or a special subframe configuration #4 according to an extended cyclic prefix, the subframe type can be determined as a downlink subframe.

Moreover, if the special subframe configuration corresponds to a special subframe configuration #7 according to an extended cyclic prefix, the subframe type can be determined according to a DCI (downlink control information) type. Preferably, if the DCI format corresponds to a DCI format 2C or a DCI format 2D, the subframe type can be determined as a downlink subframe. Or, if the DCI format corresponds to a DCI format 1A, the subframe type can be determined as a special subframe.

To further achieve these and other advantages and in accordance with the purpose of the present invention, according to a different embodiment, a method of receiving a downlink signal, which is received by a user equipment in a wireless communication system supporting carrier aggregation, can include the steps of receiving a usage change message for indicating a change from a first uplink-downlink (UL-DL) configuration to a second uplink-downlink (UL-DL) configuration and, if a specific subframe in a primary cell is set to a downlink subframe based on the second UL-DL configuration from a special subframe based on the first UL-DL configuration according to the usage change message, receiving a downlink signal in the specific subframe in the primary cell based on a special subframe type.

Moreover, if the specific subframe in a secondary cell corresponds to a special subframe, the method can further include the step of transmitting an uplink signal in an UpPTS (uplink pilot time slot) of the specific subframe in the secondary cell.

To further achieve these and other advantages and in accordance with the purpose of the present invention, according to a different embodiment, a user equipment receiving a downlink signal in a wireless communication system of a TDD (time division duplex) scheme includes an RF (radio frequency) unit and a processor, the processor configured to receive a usage change message for indicating a change from a first uplink-downlink (UL-DL) configuration to a second uplink-downlink (UL-DL) configuration, the processor, if a radio frame type according to the first UL-DL configuration and a radio frame type according to the second UL-DL configuration are different from each other in regard to a specific subframe, configured to determine a subframe type based on a special subframe configuration associated with the first UL-DL configuration, the processor configured to receive a downlink signal based on the determined subframe type.

Advantageous Effects

According to the present invention, when a radio resource is dynamically changed according to a system load in a wireless communication system, it is able to receive a downlink signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 14 is a flow diagram of a method of receiving a downlink signal according to an embodiment of the present invention.

BEST MODE

Mode for Invention

Figure 1:
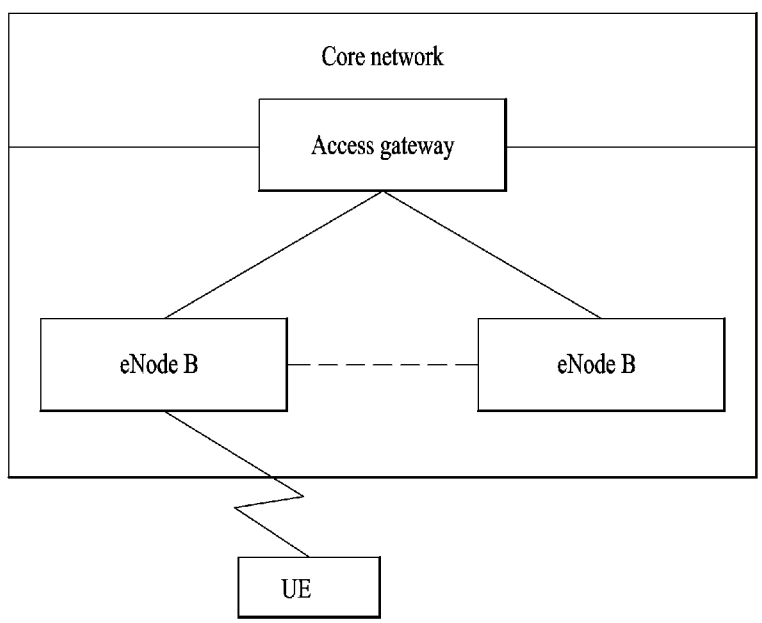
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
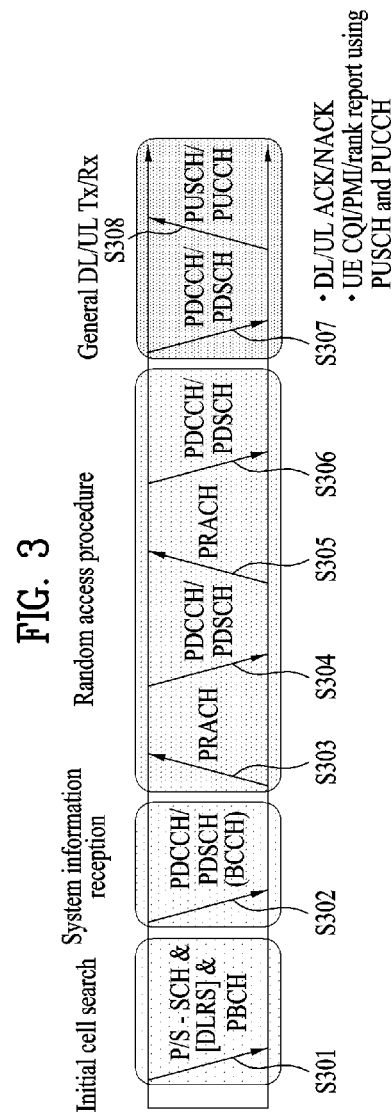
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
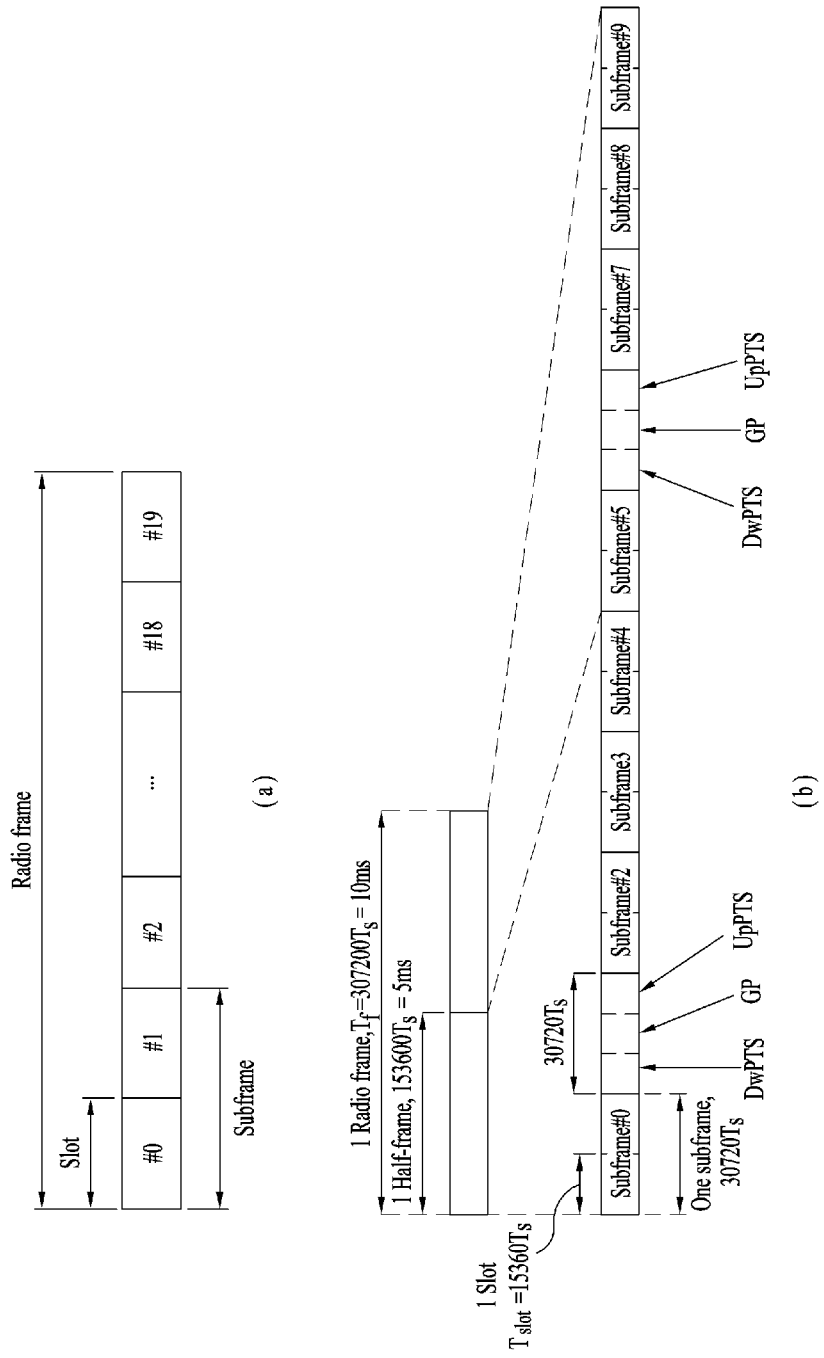
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4383 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

In case multiple cells are aggregated, the UE may assume that the guard period of the special subframe in the different cells have an overlap of at least $1456 \cdot T_s$.

Regarding a type 2 radio frame structure, in case multiple cells with different uplink-downlink configurations are aggregated and the UE is not capable of simultaneous reception and transmission in the aggregated cells, the following constraints apply.

If the subframe in the primary cell is a downlink subframe, the UE shall not transmit any signal or channel on a secondary cell in the subframe (identical to the subframe in the primary cell).

If the subframe in the primary cell is an uplink subframe, the UE is not expected to receive any downlink transmissions on a secondary cell in the subframe (identical to the subframe in the primary cell).

If the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

The structure of the aforementioned radio frame is only exemplary, and various modifications may be made in the number of subframes included in the radio frame, the number of slots included in the subframe, or the number of symbols included in the slot.

Figure 5:
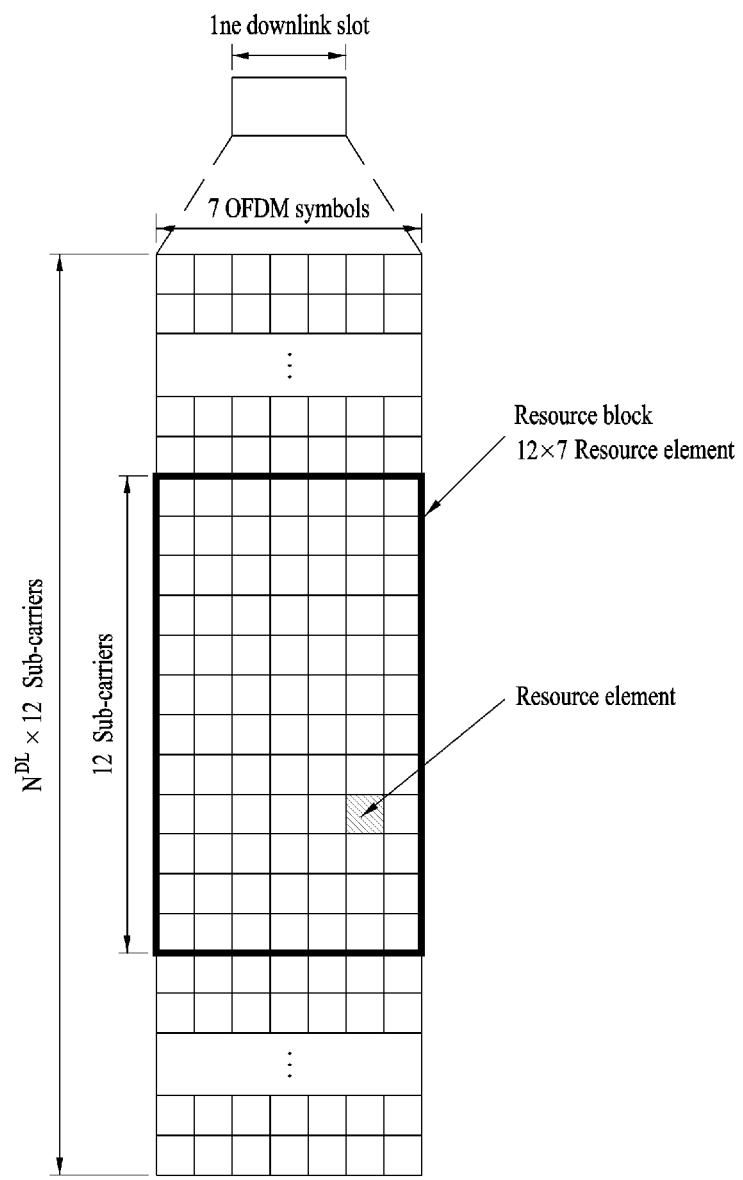
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $NR_{RB}^{DL}$ resource blocks in a frequency domain. Since each resource block includes $N_{sc}^{RB}$ subcarriers, the downlink slot includes $N_{RB}^{DL} \times N_{sc}^{RB}$ carriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
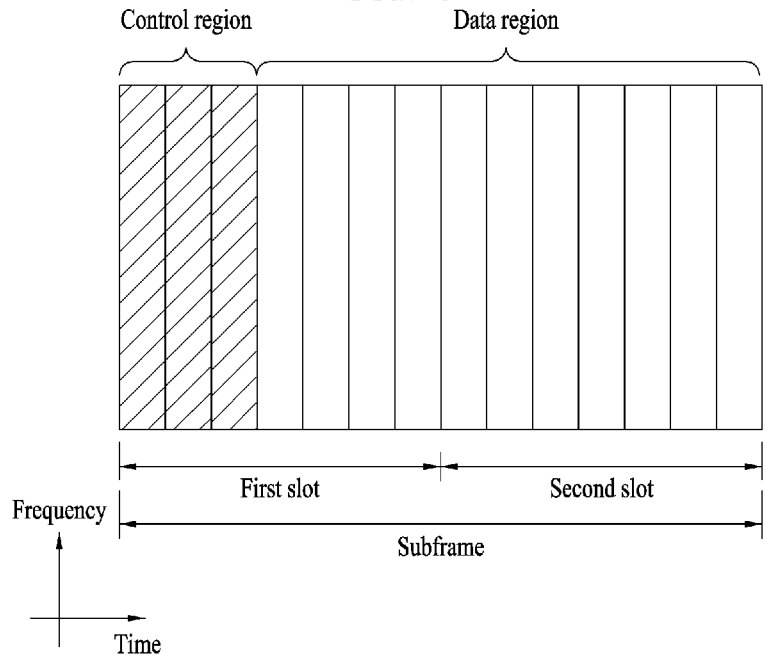
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

And, assumption on downlink signal/channel reception of a UE according to a special subframe configuration under TDD system environment and assumption on validation of downlink control signal/channel (PDCCH/EPDCCH) reception of a UE under FDD/TDD system environment are described in the 3GPP standard document. The UE may skip decoding a transport block in an initial transmission if the effective channel code rate is higher than 0.930, where the effective channel code rate is defined as the number of downlink information bits (including CRC bits) divided by the number of physical channel bits on PDSCH. If the UE skips decoding, the physical layer indicates to higher layer that the transport block is not successfully decoded. For the special subframe configurations 0 and 5 with normal downlink CP or configurations 0 and 4 with extended downlink CP, there shall be no PDSCH transmission in DwPTS of the special subframe. For more details, it may refer to 3GPP standard documentation 3GPP TS 36.213.

Referring to paragraph 9.3 of 3GPP TS 36.213 regarding PDCCH/EPDCCH control information procedure, the UE discards PDCCH/EPDCCH if matched (consistent) control information is not detected.

Figure 7:
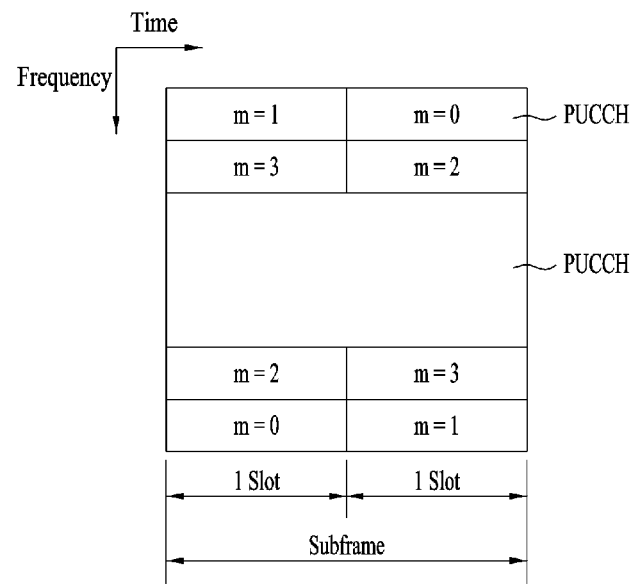
FIG. 7 is a diagram for an example of a structure of an uplink subframe in LTE.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

Figure 8:
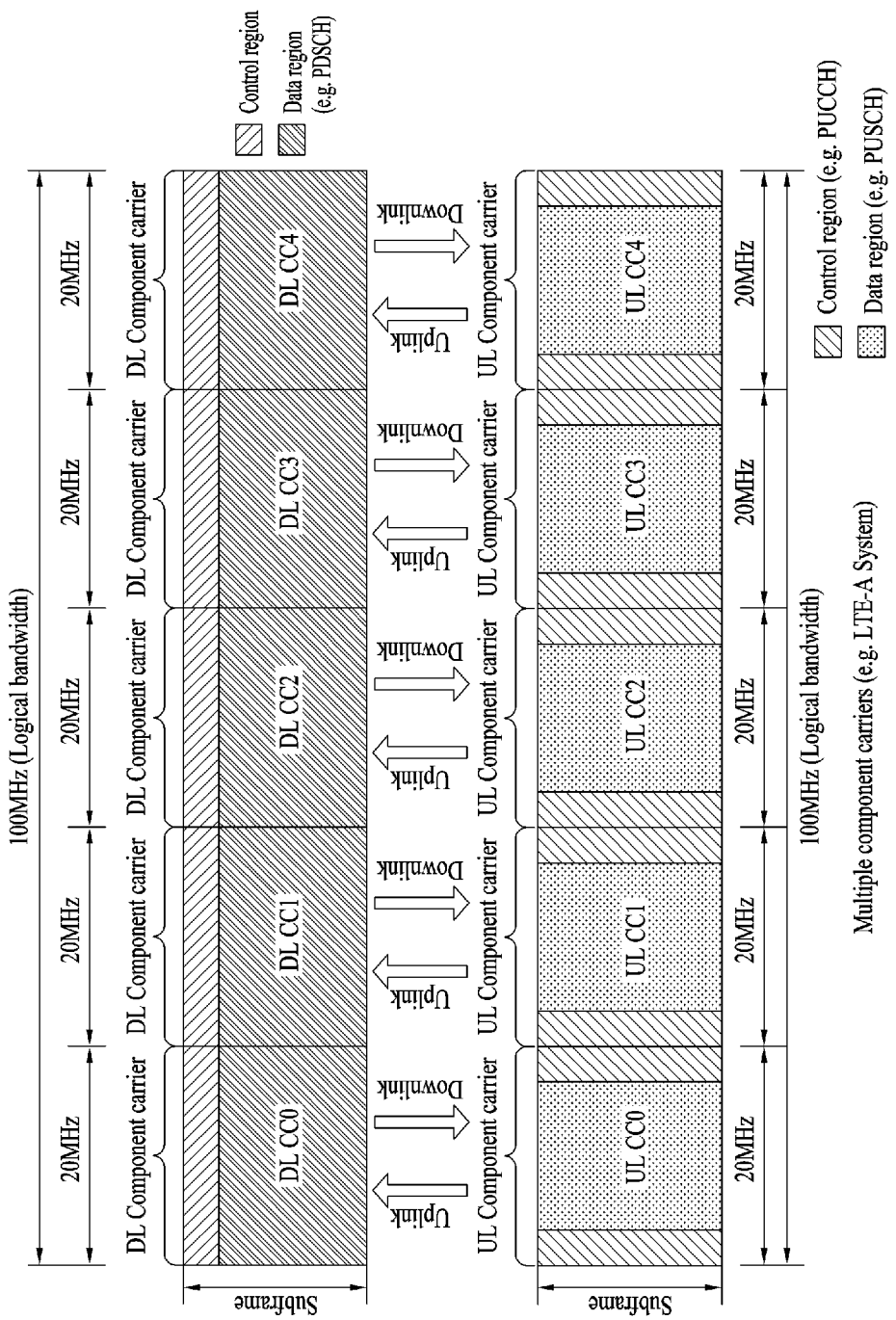
FIG. 8 is a diagram for an example of a carrier aggregation (CA) communication system.

FIG. 8 is a diagram for an example of a carrier aggregation (CA) communication system.

Referring to FIG. 8, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As an example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling). A baseline of PDCCH transmission can be summarized as follows.

CIF disabled: PDCCH on DL CC allocates a PDSCH resource on the same DL CC or a PUSCH resource on a singly linked UL CC.
No CIF
Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.
Expanded LTE DCI format including a CIF
CIF (if configured) is a stationary x-bit field (e.g., x=3)
CIF (if configured) position is fixed irrespective of a DCI format size
Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 9:
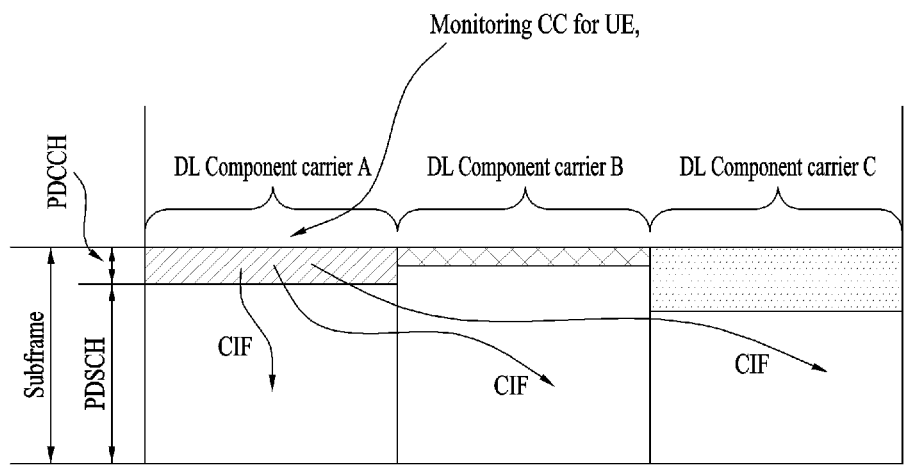
FIG. 9 is a diagram for an example of scheduling when a plurality of carriers are aggregated with each other.

FIG. 9 is a diagram for an example of a scheduling in case that a plurality of carriers are aggregated with each other. Assume that 3 DL CCs are aggregated with each other and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 10:
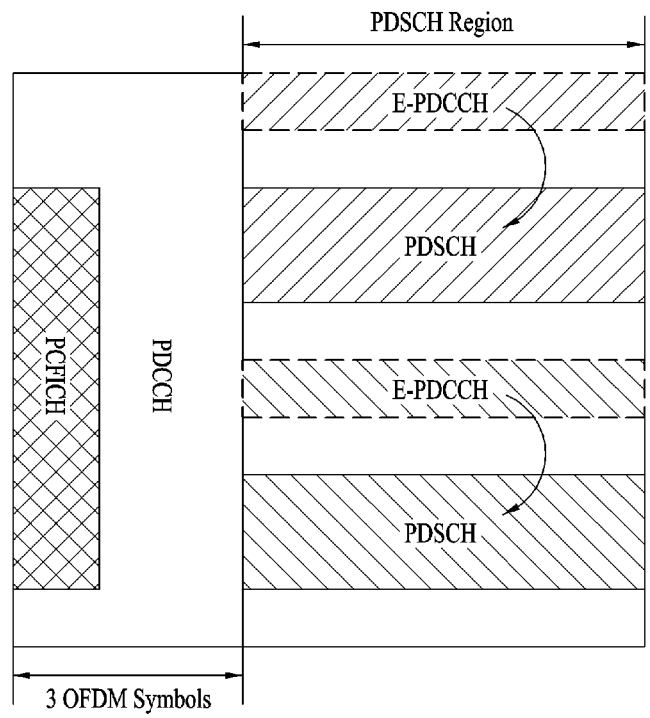
FIG. 10 is a diagram for an example of EPDCCH and PDSCH scheduled by the EPDCCH.

FIG. 10 is a diagram for an example of EPDCCH and PDSCH scheduled by the EPDCCH.

Referring to FIG. 10, in general, EPDCCH can be used in a manner of defining a part of a PDSCH region transmitting data and a UE should perform blind decoding to detect whether the UE detects EPDCCH of the UE. Although EPDCCH performs a scheduling operation (i.e., PDSCH, PUSCH control) identical to a scheduling operation of a legacy PDCCH, if the number of UEs accessing such a node as an RRH is increasing, the greater numbers of EPDCCHs are assigned to a PDSCH region and the count of blind decoding performed by a UE is increasing. Hence, there may exist a demerit in that complexity may increase.

In the following, CoMP (Cooperative Multipoint Transmission/Reception) is explained.

A system appearing after LTE-A intends to introduce a scheme of enhancing performance of a system, which is enhanced by enabling many cells to cooperate with each other. This sort of scheme is called a cooperative Multipoint Transmission/Reception (hereinafter abbreviated CoMP). The CoMP is a scheme used by two or more base stations, access points or cells to cooperatively communicate with a user equipment to smoothly perform communication between the specific user equipment and the base stations, the access points or the cells. Throughout the present invention, a base station, an access point or a cell can be used as an identical meaning.

In general, inter-cell interference may decrease performance of a user equipment situated at a cell boundary and throughput of an average sector in a multi-cell environment where a frequency reuse index corresponds to 1. In order to reduce the inter-cell interference, a legacy LTE system adopted a simple and passive method such as a fractional frequency reuse (FFR) via UE-specific power control for a user equipment situated at a cell boundary to have a reasonable performance efficiency in an interference-limited environment. Yet, instead of reducing the use of frequency resource per each cell, it may be more preferable to reduce the ICI or reuse the ICI with a signal desired by a user equipment. In order to achieve the aforementioned purpose, the CoMP transmission scheme can be applied.

Figure 11:
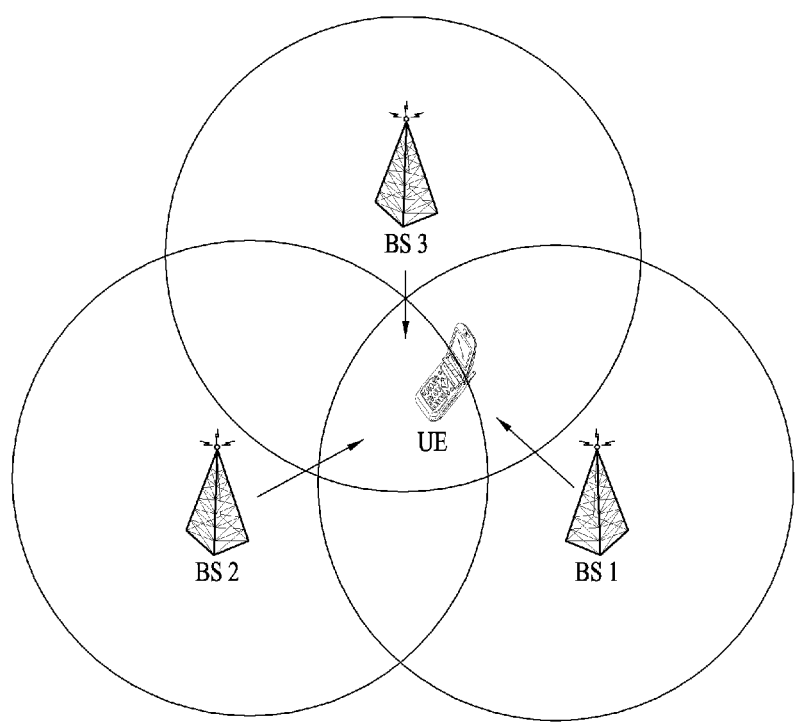
FIG. 11 is a diagram for an example of performing CoMP.

FIG. 11 is a diagram for an example of performing CoMP. Referring to FIG. 11, a wireless communication system includes a plurality of base stations (a BS 1, a BS 2 and a BS 3) performing the CoMP and a user equipment. A plurality of the base stations (the BS 1, the BS 2 and the BS 3) performing the CoMP can efficiently transmit data to the user equipment in a manner of cooperating with each other. The CoMP can be mainly classified into two types according to whether data is transmitted from each of a plurality of the base stations performing the CoMP:

Joint processing (CoMP Joint Processing (CoMP-JP))
Cooperative scheduling/beamforming (CoMP-CS/CB)

According to the CoMP-JT, data are simultaneously transmitted to a user equipment from each of a plurality of the base stations performing the CoMP and the user equipment increases reception capability by combining signals transmitted from each of a plurality of the base stations with each other. In particular, according to the CoMP-JP scheme, data can be used in each point (base station) of CoMP cooperation units. The CoMP cooperation units indicate a set of base stations used for a cooperative transmission scheme. The JP scheme can be classified into a joint transmission scheme and a dynamic cell selection scheme.

The joint transmission scheme means a scheme that PDSCHs are simultaneously transmitted from a plurality of transmission points (a part or a whole of the CoMP cooperation units). In particular, data transmitted to single user equipment can be simultaneously transmitted from a plurality of the transmission points. According to the joint transmission scheme, quality of a received signal can be coherently or non-coherently enhanced and interference interfering a different user equipment may be actively eliminated as well.

The dynamic cell selection scheme means a scheme that PDSCH is transmitted from a single transmission point (of the CoMP cooperation units) at a time. In particular, data transmitted to single user equipment on a specific time is transmitted from a single point and different points of the CoMP cooperation units do not transmit data to the user equipment on the specific time. A point, which transmits data to the user equipment, can be dynamically selected.

On the contrary, in case of the CoMP-CS, data is transmitted to single user equipment on a random moment via a base station and scheduling or beamforming is performed to minimize interference from a different base station. In particular, according to the CoMP-CS/CB scheme, the CoMP cooperation units can cooperatively perform beamforming for the data transmission transmitted to the single user equipment. In this case, although the data is transmitted from a serving cell, user scheduling/beamforming can be determined by coordination of cells of the CoMP cooperation units.

Meanwhile, in case of UL, coordinated multi-point reception means to receive a signal transmitted by coordination of a plurality of points, which are geographically away from each other. A CoMP scheme applicable to a case of UL can be classified into Joint Reception (JR) and a coordinated scheduling/beamforming (CS/CB).

The JR scheme means that a signal transmitted via PUSCH is received by a plurality of reception points. The CS/CB scheme means that PUSCH is received by a single point and user scheduling/beamforming is determined by coordination of cells of the CoMP cooperation units.

Figure 12:
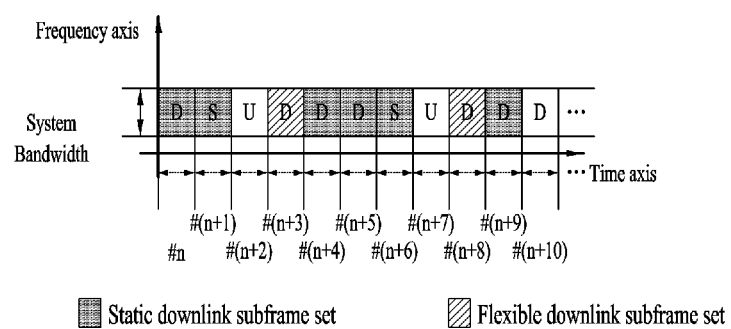
FIG. 12 is a diagram for a case of dynamically changing a usage of a radio resource in TDD system environment.

FIG. 12 is a diagram for a case of using a part of legacy uplink resources (i.e., UL SF), which is used by a specific cell according to the increase of downlink load amount, for the purpose of downlink communication in TDD system environment. In FIG. 12, assume uplink-downlink (UL/DL) configuration configured via an SIB as an uplink-downlink #1 (i.e., DSUUDDSUUD) and it is able to know that a legacy UL SF # (n+3) and a UL SF # (n+8) are used for a usage of DL communication in a manner of being changed via a predetermined signal (e.g., a physical/upper layer signal or a system information signal).

Based on the aforementioned discussion, the present invention proposes a method for a UE to efficiently perform downlink signal/channel reception and/or uplink signal/channel transmission at random timing when a specific cell dynamically changes a usage of a radio resource according to a load state of a system.

In the following, for clarity, the present invention is explained based on 3GPP LTE system. However, a system range to which the present invention is applied can also be extended to a different system rather than the 3GPP LTE system. Embodiments of the present invention can also be extensively applied to a case that a resource on a specific cell (or component carrier (CC)) is dynamically changed according to a load state of a system under environment to which a carrier aggregation (CA) scheme is applied. And, the embodiments of the present invention can also be extensively applied to a case that a usage of a radio resource is dynamically changed in a TDD system or a FDD system.

Before the present invention is explained in detail, when UL-DL configurations different from each other according to a cell (or a component carrier (CC)) are designated under environment to which a carrier aggregation (CA) scheme is applied, assumption on downlink signal/channel reception and/or uplink signal/channel transmission of a half-duplex (HD) UE is identical to what is mentioned earlier in relation to a type-2 radio frame structure.

Signal Transmitted and Received in Consideration of Special Subframe Configuration When a specific cell dynamically changes a usage of a radio resource according to a load state of a system, there may exist i) SIB 1 information-based UL-DL configuration or RadioResourceConfigCommonSCell IE information-based UL-DL configuration, ii) usage change message (signaling for TDD UL-DL reconfiguration)-based UL-DL configuration, DL HARQ reference configuration-related UL-DL configuration, and UL HARQ reference configuration-related UL-DL configuration in the aspect of a specific UE (eIMTA UE) performing communication with the specific cell.

In this situation, it is ambiguous for a UE which subframe usage information of a UL-DL configuration is to be used for performing downlink signal/channel reception and/or uplink signal/channel transmission at random subframe timing.

In order to solve the aforementioned problem, the present invention proposes configurations described in the following. If a subframe usage of random timing (i.e., SF # N) is designated as a special subframe in an SIB 1 information-based UL-DL configuration or RadioResourceConfigCommonSCell IE information-based UL-DL configuration) of a specific UE (eIMTA UE) and is designated as a downlink subframe (DL subframe) in a usage change message-based UL-DL configuration or a DL HARQ reference configuration-related UL-DL configuration, it is able to apply at least one selected from the group consisting of a configuration #1-A, a configuration #1-B and a configuration #1-C.

Moreover, the configurations described in the following (i.e., the configuration #1-A to the configuration #1-C) can be configured to be restrictively applied only when a UE successfully decodes the usage change message-based UL-DL configuration.

Configuration #1-A

According to the configuration #1-A of the present invention, if a special subframe configuration is set to a normal CP-based special subframe configuration #0 or a normal CP-based special subframe configuration #5, it is able to configure a subframe usage of random timing (i.e., SF # N) to be considered as a downlink subframe (DL subframe) according to a usage change message-based UL-DL configuration.

In this case, as an example, a UE can assume at least one selected from the group consisting of i) a PDSCH/EPDCCH RE mapping rule, ii) a DM-RS (demodulation reference signal) pattern, iii) a CRS transmission pattern, and iv) an EPDCCH transmission rule (e.g., number of EREGS per ECCE, minimum AL, starting/ending symbol of EPDDCH transmission) related to a DL subframe in a subframe of the random timing (i.e., SF # N) and may be then able to configure the UE to perform a downlink signal/channel reception operation.

In particular, according to a legacy LTE system, although a UE does not expect PDSCH reception on DwPTS of a special subframe (i.e., SF # N) configured by the normal CP-based special subframe configuration #0 or the normal CP-based special subframe configuration #5 (i.e., refer to paragraph 7.1.7 of 3GPP TS 36.213), the UE is able to perform a downlink signal/channel (e.g., PDSCH/EPDCCH) reception operation at corresponding timing according to the configuration #1-A.

And, i) if a UE fails to successfully decode the usage change message-based UL-DL configuration (i.e., if the UE fails to perform CRC check-based reception), ii) if the UE fails to successfully receive a usage change message due to a DRX operation, or iii) if a different normal CP-based special subframe configuration is configured instead of the aforementioned normal CP-based special subframe configuration, it is able to configure the subframe usage of the random timing (i.e., SF # N) to be exceptionally considered as a special subframe.

Configuration #1-B

According to the configuration #1-B of the present invention, if a special subframe configuration is set to an extended CP-based special subframe configuration #0 or an extended CP-based special subframe configuration #4, it is able to configure a subframe usage of random timing (i.e., SF # N) to be considered as a downlink subframe (DL subframe) according to a usage change message-based UL-DL configuration.

In this case, as an example, a UE can assume at least one selected from the group consisting of i) a PDSCH/EPDCCH RE mapping rule, ii) a DM-RS (demodulation reference signal) pattern, iii) a CRS transmission pattern, and iv) an EPDCCH transmission rule (e.g., number of EREGS per ECCE, minimum AL) related to a DL frame in a subframe of the random timing (i.e., SF # N) and may be able to configure the UE to perform a downlink signal/channel reception operation.

In particular, according to a legacy LTE system, although a UE does not expect PDSCH reception on DwPTS of a special subframe (i.e., SF # N) configured by the extended CP-based special subframe configuration #0 or the extended CP-based special subframe configuration #4 (i.e., refer to paragraph 7.1.7 of 3GPP TS 36.213), the UE is able to perform a downlink signal/channel (e.g., PDSCH/EPDCCH) reception operation at corresponding timing according to the configuration #1-B.

And, i) if a UE fails to successfully decode the usage change message-based UL-DL configuration (i.e., if the UE fails to perform CRC check-based reception), ii) if the UE fails to successfully receive a usage change message due to a DRX operation, or iii) if a different extended CP-based special subframe configuration is configured instead of the aforementioned extended CP-based special subframe configuration, it is able to configure the subframe usage of the random timing (i.e., SF # N) to be exceptionally considered as a special subframe.

Configuration #1-C

According to the configuration #1-C of the present invention, if a special subframe configuration is set to an extended CP-based special subframe configuration #7, a subframe usage of corresponding timing can configured to be determined as either i) a downlink subframe (DL subframe) according to a usage change message-based UL-DL configuration or ii) a special subframe according to an SIB 1 information-based UL-DL configuration or RadioResourceConfigCommonSCell IE information-based UL-DL configuration depending on a type of a DCI format detected on a control channel (e.g., PDCCH) of random subframe timing (i.e., SF # N) or a type of a TM related to the DCI format detected on the control channel of random subframe timing.

In particular, according to a legacy LTE system, since a DM-RS is not transmitted or defined on DwPTS of a special subframe (i.e., SF # N) configured by the extended CP-based special subframe configuration #7, i) TM (transmission mode)-related PDSCH transmission requiring DM-RS-based decoding and/or ii) TM-related DCI format transmission requiring DM-RS-based decoding are not expected or performed.

Yet, if a dynamic change mode of a radio resource usage is set, it is able to reconfigure a TM-related DCI format (e.g., DCI format 2C) transmission requiring the DM-RS-based decoding to be additionally performed or expected on a control channel of the random subframe timing (i.e., SF # N). Hence, it is able to configure a UE to identify whether a subframe usage of the corresponding timing is used as i) a downlink subframe according to the usage change message-based UL-DL configuration or ii) a special subframe according to the SIB 1 information-based UL-DL configuration or RadioResourceConfigCommonSCell IE information-based UL-DL configuration based on a type of a DCI format detected on the control channel of the subframe timing (i.e., SF # N).

Specifically, if a TM-related DCI format (e.g., DCI format 2 (e.g., 2C/2D)) requiring DM-RS-based decoding is detected on a control channel of corresponding subframe timing (i.e., SF # N), a subframe usage of the random timing (i.e., SF # N) can be configured to be considered as a downlink subframe according to a usage change message-based UL-DL configuration. In particular, it may assume at least one selected from the group consisting of i) a PDSCH/EPDCCH RE mapping rule, ii) a DM-RS pattern, iii) a CRS transmission pattern, and iv) an EPDCCH transmission rule (e.g., number of EREGS per ECCE, minimum AL) related to a DL subframe.

On the contrary, if a TM-related DCI format (e.g., fallback DCI format (e.g., 1A)) requiring non DM-RS (e.g., CRS)-based decoding is detected on a control channel of corresponding subframe timing (i.e., SF # N), a subframe usage of the random timing (i.e., SF # N) can be configured to be considered as a special subframe according to an SIB 1 information-based UL-DL configuration or RadioResourceConfigCommonSCell IE information-based UL-DL configuration. In particular, it may be able to assume at least one selected from the group consisting of i) a PDSCH/EPDCCH RE mapping rule, ii) a DM-RS pattern, iii) a CRS transmission pattern, and iv) an EPDCCH transmission rule (e.g., number of EREGS per ECCE, minimum AL) related to a special subframe.

In particular, according to a legacy LTE system, although a UE does not expect TM-related PDSCH/DCI format reception requiring DM-RS-based decoding on DwPTS of a special subframe (i.e., SF # N) configured by the extended CP-based special subframe configuration #7, the UE is able to perform a TM-related PDSCH/DCI format reception operation requiring the DM-RS-based decoding at the corresponding timing according to the configuration #1-C.

And, i) if a UE fails to successfully decode the usage change message-based UL-DL configuration (i.e., if the UE fails to perform CRC check-based reception, ii) if the UE fails to successfully receive a usage change message due to a DRX operation, or iii) if a different extended CP-based special subframe configuration is configured instead of the aforementioned extended CP-based special subframe configuration #7, it is able to configure the subframe usage of the random timing (i.e., SF # N) to be considered as a special subframe or it may be able to reconfigure transmission of the TM-related DCI format requiring the DM-RS-based decoding not to be expected or performed on the control channel of the random subframe timing (i.e., SF # N) (i.e., it may prevent false alarm probability from being increased)).

Moreover, a DCI format for notifying a subframe usage of random timing (i.e., SF # N) can be configured to be transmitted on a predefined specific control channel (e.g., PDCCH or EPDCCH) and/or a predefined search space (e.g., CSS or USS) only. In this case, as an example, it is able to configure a base station to inform a UE of the aforementioned information through a predefined signal (e.g., a physical layer signal or a higher layer signal). Or, the information can be configured to be implicitly identified by a predefined rule.

Signal Transmitted and Received in Consideration of Carrier Aggregation

When a dynamic change operation of a radio resource usage is performed according to a cell (or a component carrier) under a situation to which a carrier aggregation (CA) scheme is applied, it is able to (re)configure a half-duplex UE according to a cell (or a component carrier) at random subframe timing (i.e., SF # N) or the aforementioned restriction of paragraph 7.1.7 of 3GPP 36.213 can be applied to the UE according to a combination of (re)changed subframe usages. For clarity, Table 3 based on the paragraph 7.1.7 of 3GPP 36.213 is explained.

TABLE 3

In case multiple cells with different uplink-downlink configurations are aggregated and the UE is not capable of simultaneous reception and transmission in the aggregated cells, the following constraints apply:

[PRINCIPLE#A] If the subframe in the primary cell is a downlink subframe, the UE shall not transmit any signal or channel on a secondary cell in the same subframe
[PRINCIPLE#B] If the subframe in the primary cell is an uplink subframe, the UE is not expected to receive any downlink transmissions on a secondary cell in the same subframe
[PRINCIPLE#C] If the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

Referring to Table 3, in case multiple cells with different uplink-downlink configurations are aggregated and the UE is not capable of simultaneous reception and transmission in the aggregated cells, the following constraints apply. i) If the subframe in the primary cell is a downlink subframe, the UE shall not transmit any signal or channel on a secondary cell in the subframe (identical to the subframe in the primary cell) (i.e., configuration #2-A). ii) If the subframe in the primary cell is an uplink subframe, the UE is not expected to receive any downlink transmissions on a secondary cell in the subframe (identical to the subframe in the primary cell) (i.e., configuration #2-B). Moreover, iii) if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell (i.e., configuration #2-C).

In the following, for clarity, SIB 1 information-based UL-DL configuration (i.e., PCell) or RadioResourceConfigCommonSCell IE information-based UL-DL configuration (i.e., Scell) is configured by two different cells (or component carriers) using a carrier aggregation scheme. The present invention can be extensively applied to a case that a partial (or a component carrier) cell performs a dynamic change operation of a radio resource usage only among cells (or component carriers) to which the carrier aggregation scheme is applied. And, the present invention can also be extensively applied to a situation that two or more cells (or component carriers) are configured by the carrier aggregation scheme.

Configuration 2-A:

A configuration 2-A, which is applied when all (re)configured subframe usages of PCell and Scell correspond to a downlink subframe at specific subframe timing (i.e., SF # N), is explained with reference to Table 4 and Table 5 in the following.

TABLE 4

| | Subframe usage designated by SIB 1 information (i.e., PCell) or RadioResourceConfigCommonSCell IE information (i.e., Scell)-based UL-DL configuration | Subframe usage (re)designated by usage change message-based UL-DL configuration (i.e., SF #N timing) |
|---|---|---|
| PCell | special subframe | downlink subframe |
| SCell | downlink subframe | downlink subframe |
| UE operation | Perform downlink signal/channel reception and/or uplink signal/channel transmission per cell in accordance with [configuration #2-C] of Table 3 (i.e., it is unable to perform downlink signal/channel reception operation on downlink subframe of Scell) | Perform downlink signal/channel reception per cell in accordance with configuration 2-A |

TABLE 5

| | Subframe usage designated by SIB 1 information (i.e., PCell) or RadioResourceConfigCommonSCell IE information (i.e., Scell)-based UL-DL configuration | Subframe usage (re)designated by usage change message-based UL-DL configuration (i.e., SF #N timing) |
|---|---|---|
| PCell | downlink subframe | downlink subframe |
| SCell | special subframe | downlink subframe |
| UE operation | Perform downlink signal/channel reception and/or uplink signal/channel transmission per cell in accordance with configuration #2-A of Table 3 (i.e., it is unable to perform uplink signal/channel transmission operation on UpPTS od special subframe of Scell) | Perform downlink signal/channel reception per cell in accordance with configuration 2-A |

If a special subframe on SIB 1 information-based UL DL configuration or RadioResourceConfigCommonSCell IE information-based UL-DL configuration is (re)designated as a downlink subframe by a usage change message-based UL-DL configuration, a UE can be configured to perform a downlink signal/channel reception operation according to at least one selected from the group consisting of i) a PDSCH/EPDCCH RE mapping rule, ii) a DM-RS (demodulation reference signal) pattern, iii) a CRS transmission pattern, and iv) an EPDCCH transmission rule (e.g., number of EREGS per ECCE, minimum AL) related to DwPTS of the special subframe, although the UE actually performs the operation in the downlink subframe.

If a downlink subframe on SIB 1 information-based UL DL configuration or RadioResourceConfigCommonSCell IE information-based UL-DL configuration is (re)designated as a downlink subframe by a usage change message-based UL-DL configuration, a UE can be configured to perform a downlink signal/channel reception operation in the subframe according to at least one selected from the group consisting of i) a PDSCH/EPDCCH RE mapping rule, ii) a DM-RS (demodulation reference signal) pattern, iii) a CRS transmission pattern, and iv) an EPDCCH transmission rule (e.g., number of EREGS per ECCE, minimum AL) related to DwPTS of the special subframe.

Configuration 2-B

A configuration 2-B, which is applied when (re)configured subframe usages of PCell and Scell at specific subframe timing (i.e., SF # N) respectively correspond to a downlink subframe and a special subframe (i.e., Table 6) or when (re)configured subframe usages of PCell and Scell at specific subframe timing (i.e., SF # N) respectively correspond to a special subframe and a downlink subframe (i.e., Table 7), is explained with reference to Table 6 and Table 7 in the following.

TABLE 6

| | Subframe usage designated by SIB 1 information (i.e., PCell) or RadioResourceConfigCommonSCell IE information (i.e., Scell)-based UL-DL configuration | Subframe usage (re)designated by usage change message-based UL-DL configuration (i.e., SF #N timing) |
|---|---|---|
| PCell | special subframe | downlink subframe |
| SCell | special subframe | special subframe |
| UE operation | Perform downlink signal/channel reception and/or uplink signal/channel transmission according to special subframe configuration per cell | Perform downlink signal/channel reception per cell in accordance with configuration 2-B |

TABLE 7

| | Subframe usage designated by SIB 1 information (i.e., PCell) or RadioResourceConfigCommonSCell IE information (i.e., Scell)-based UL-DL configuration | Subframe usage (re)designated by usage change message-based UL-DL configuration (i.e., SF #N timing) |
|---|---|---|
| PCell | special subframe | special subframe |
| SCell | special subframe | downlink subframe |
| UE operation | Perform downlink signal/channel reception and/or uplink signal/channel transmission according to special subframe configuration per cell | Perform downlink signal/channel reception per cell in accordance with configuration 2-B |

If a special subframe on SIB 1 information-based UL DL configuration or RadioResourceConfigCommonSCell IE information-based UL-DL configuration is (re)designated as a downlink subframe by a usage change message-based UL-DL configuration, a UE can be configured to perform a downlink signal/channel reception operation according to at least one selected from the group consisting of i) a PDSCH/EPDCCH RE mapping rule, ii) a DM-RS (demodulation reference signal) pattern, iii) a CRS transmission pattern, and iv) an EPDCCH transmission rule (e.g., number of EREGS per ECCE, minimum AL) related to DwPTS of the special subframe of the special subframe, although the UE actually performs the operation in the downlink subframe.

If a special subframe on SIB 1 information-based UL DL configuration or RadioResourceConfigCommonSCell IE information-based UL-DL configuration is (re)designated as a special subframe by a usage change message-based UL-DL configuration, a UE can be configured to perform a downlink signal/channel reception operation in the subframe according to at least one selected from the group consisting of i) a PDSCH/EPDCCH RE mapping rule, ii) a DM-RS (demodulation reference signal) pattern, iii) a CRS transmission pattern, and iv) an EPDCCH transmission rule (e.g., number of EREGS per ECCE, minimum AL) related to the special subframe.

Hence, in case of Table 6, unlike the configuration #2-A of Table 3, it is able to configure a UE to perform an uplink signal/channel transmission operation on UpPTS of a special subframe of Scell. This is because the UpPTS of the special subframe of the Scell and a region of the PCell in which a downlink signal/channel reception operation is actually performed (i.e., the downlink subframe actually follows a DwPTS-related downlink signal/channel reception characteristic of the special subframe) are not overlapped with each other.

In case of Table 7, unlike the configuration #2-C of Table 3, it is able to configure a UE to perform a downlink signal/channel reception operation in a part corresponding to a DwPTS region of a downlink subframe of Scell. This is because a region of the downlink subframe of the SCell in which a downlink signal/channel reception operation is actually performed (i.e., the downlink subframe actually follows a DwPTS-related downlink signal/channel reception characteristic of the special subframe) and GP/UpPTS of the special subframe of PCell are not overlapped with each other.

When a dynamic change operation of a radio resource usage is performed according to a cell (or a component carrier) under a situation to which a carrier aggregation (CA) scheme is applied, a half-duplex UE can perform a downlink signal/channel reception operation and/or an uplink signal/channel transmission operation per cell in a manner of comparing/matching a combination (e.g., Table 4 to Table 7) of subframe usages, which is (re)configured according to a cell (or a component carrier) at random subframe timing, to Table 3.

And, it may be able to configure i) a normal CP-based special subframe configuration #0, ii) a normal CP-based special subframe configuration #5, iii) an extended CP-based special subframe configuration #0, iv) an extended CP-based special subframe configuration #4, and v) an extended CP-based special subframe configuration #7 to be (intentionally) set to a cell in which a dynamic change operation of a radio resource usage is performed. By doing so, DL data throughput can be maximized when a UE (i.e., eIMTA UE) successfully decodes a usage change message-based UL-DL configuration.

Or, it may be able to configure i) a normal CP-based special subframe configuration #0, ii) a normal CP-based special subframe configuration #5, iii) an extended CP-based special subframe configuration #0, iv) an extended CP-based special subframe configuration #4, and v) an extended CP-based special subframe configuration #7 not to be (intentionally) set to a cell in which a dynamic change operation of a radio resource usage is performed. By doing so, DL data throughput of an appropriate level can be secured irrespective of whether or not a UE (eIMTA UE) successfully decodes a usage change message-based UL-DL configuration.

The aforementioned embodiments of the present invention may correspond to at least one selected from the group consisting of i) a case that a dynamic change operation of a radio resource usage is configured, ii) a case that a specific transmission mode (TM) is configured, iii) a case that a specific UL-DL configuration is configured, iv) a case that special subframe configurations per cell are identically configured, v) a case that a UE corresponds to a half-duplex UE or a full-duplex UE, and vi) a case that a special subframe on SIB 1 information-based UL-DL configuration or RadioResourceConfigCommonSCell IE information-based UL-DL configuration is (re)designated as a downlink subframe by a usage change message-based UL-DL configuration. The embodiments of the present invention can be configured to be restrictively applied only when a UE is configured to perform a downlink signal/channel reception operation according to at least one selected from the group consisting of a) a PDSCH/EPDCCH RE mapping rule, b) a DM-RS (demodulation reference signal) pattern, c) a CRS transmission pattern, and d) an EPDCCH transmission rule (e.g., number of EREGS per ECCE, minimum AL) related to DwPTS of the special subframe, although the UE performs the operation in the downlink subframe.

Each of the aforementioned embodiments/configurations/rules can be implemented as an independent embodiment and can be implemented in a manner of being combined (aggregated) with each other.

Figure 13:
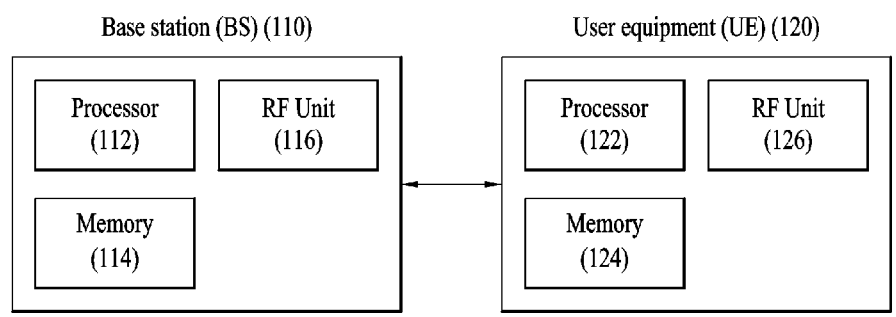
FIG. 13 is a diagram for a base station and a user equipment capable of being applied to an embodiment of the present invention.

FIG. 13 is a diagram for a base station and a user equipment capable of being applied to an embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 13, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 1224 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

FIG. 14 is a flow diagram of a method of receiving a downlink signal according to an embodiment of the present invention. In step 1405 of FIG. 14, the UE receives a usage change message for indicating a change from a first uplink-downlink (UL-DL) configuration to a second uplink-downlink (UL-DL) configuration. In step 1410 of FIG. 14, if a special subframe according to the first UL-DL configuration is indicated to be changed to a downlink subframe according to the second UL-DL configuration by the usage change message, then in step 1415 of FIG. 14, the UE determines whether the special subframe is changed to the downlink subframe based on a special subframe configuration and a cyclic prefix of the special subframe according to the first UL-DL configuration. In step 1420 of FIG. 14, the UE receives a downlink signal based on whether the special subframe is changed to the downlink subframe.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of transmitting and receiving a downlink signal in a wireless communication system and an apparatus therefor are described centering on examples applied to 3GPP LTE system, it may be applicable to various wireless communication systems as well as to the 3GPP LTE system.

What is claimed is:

1. A method of receiving a downlink signal, which is received by a user equipment in a wireless communication system of a time division duplex (TDD) scheme, the method comprising:
   receiving a usage change message for informing of a change from a first uplink-downlink (UL-DL) configuration to a second UL-DL configuration,
   wherein the usage change message informs of that a special subframe of the first UL-DL configuration is to be changed to a downlink subframe of the second UL-DL configuration;
   determining whether the special subframe is changed to the downlink subframe based on a special subframe configuration and a cyclic prefix of the special subframe related to the first UL-DL configuration; and
   receiving the downlink signal based on whether the special subframe is changed to the downlink subframe,
   wherein the special subframe configuration is a special subframe configuration #7 and the cyclic prefix is an extended cyclic prefix, and
   wherein, based on a downlink control information (DCI) format 1A for receiving the downlink signal, the special subframe is determined not to be changed.

2. The method of claim 1, wherein the downlink signal is received based on at least one selected from a group consisting of a physical downlink shared channel (PDSCH)/enhanced physical downlink control channel (EPDCCH) resource element mapping rule, a demodulation reference signal (DM-RS) pattern, a cell-specific reference signal (CRS) transmission pattern, and an EPDCCH transmission rule according to whether the special subframe is changed to the downlink subframe.

3. The method of claim 1, wherein, based on a DCI format 2C or a DCI format 2D for receiving the downlink signal, the special subframe is determined to be changed to the downlink subframe.

4. The method of claim 1, wherein the special subframe is changed to the downlink subframe based on a DCI format requiring demodulation reference signal (DM-RS) based decoding for receiving the downlink signal.

5. A user equipment for receiving a downlink signal in a wireless communication system of a time division duplex (TDD) scheme, the user equipment comprising:
   a transceiver; and
   a processor,
   wherein the processor is configured to:
      control the transceiver to receive a usage change message for informing of a change from a first uplink-downlink (UL-DL) configuration to a second UL-DL configuration,
      wherein the usage change message informs of that a special subframe of the first UL-DL configuration is to be changed to a downlink subframe of the second UL-DL configuration,
      determine whether the special subframe is changed to the downlink subframe based on a special subframe configuration and a cyclic prefix of the special subframe related to the first UL-DL configuration, and
      control the transceiver to receive the downlink signal based on whether the special subframe is changed to the downlink subframe,
      wherein the special subframe configuration is a special subframe configuration #7 and the cyclic prefix is an extended cyclic prefix, and
      wherein, based on a downlink control information (DCI) format 1A for receiving the downlink signal, the special subframe is determined not to be changed.

6. The user equipment of claim 5, wherein the downlink signal is received based on at least one selected from a group consisting of a physical downlink shared channel (PDSCH)/enhanced physical downlink control channel (EPDCCH) resource element mapping rule, a demodulation reference signal (DM-RS) pattern, a cell-specific reference signal (CRS) transmission pattern, and an EPDCCH transmission rule according to whether the special subframe is changed to the downlink subframe.

7. The user equipment of claim 5, wherein, based on a DCI format 2C or a DCI format 2D for receiving the downlink signal, the special subframe is determined to be changed to the downlink subframe.

8. The user equipment of claim 5, wherein the special subframe is changed to the downlink subframe based on a DCI format requiring demodulation reference signal (DM-RS) based decoding for receiving the downlink signal.

* * * * *